Figure 1:
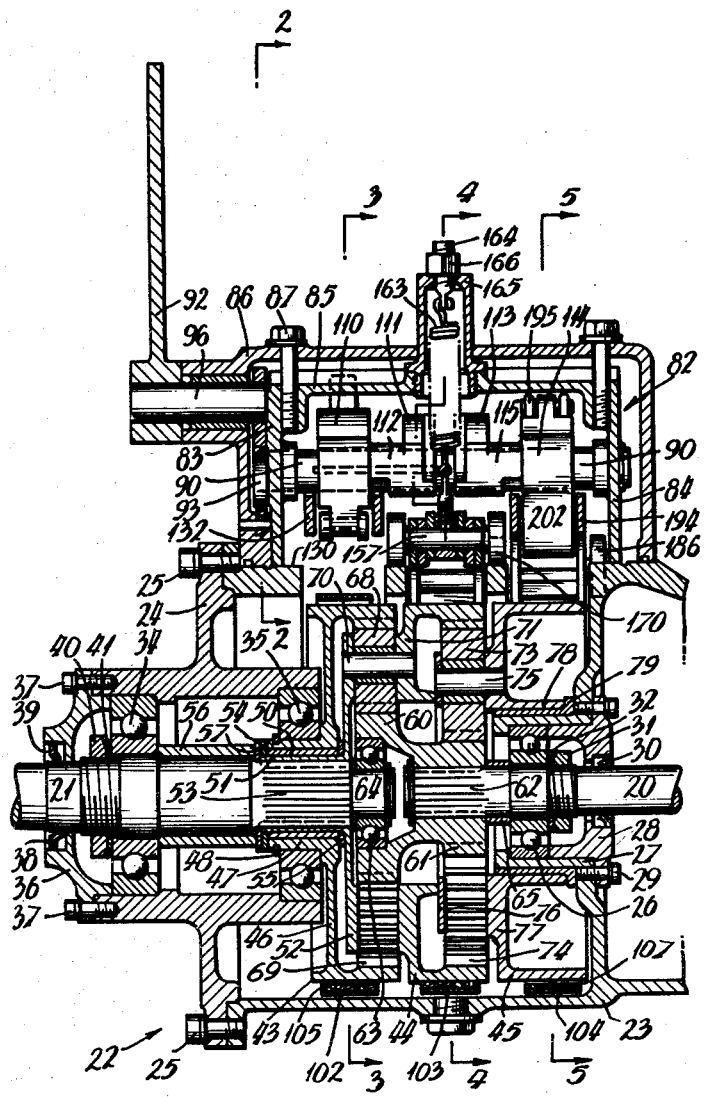

Jan. 7, 1964 K. A. QUICK ETAL 3,116,817
POWER TRANSMISSION AND BRAKE MECHANISMS
Filed May 12, 1961 7 Sheets-Sheet 2
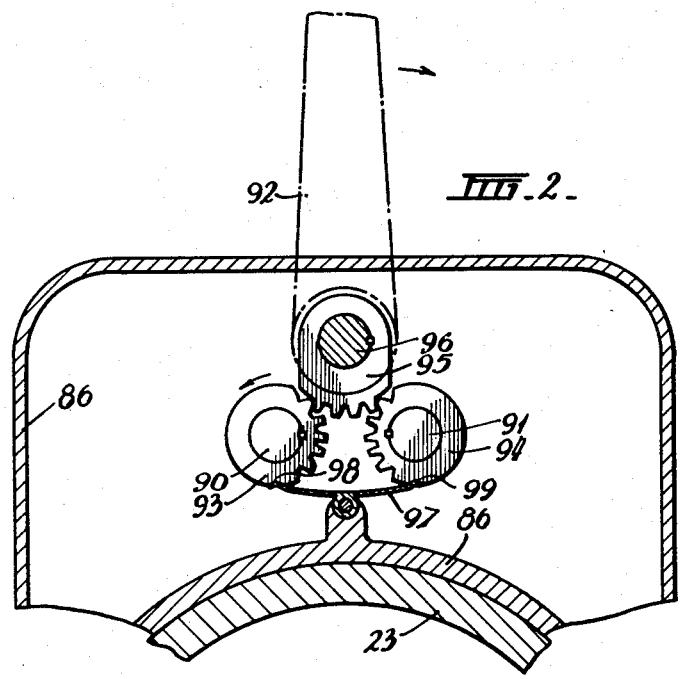
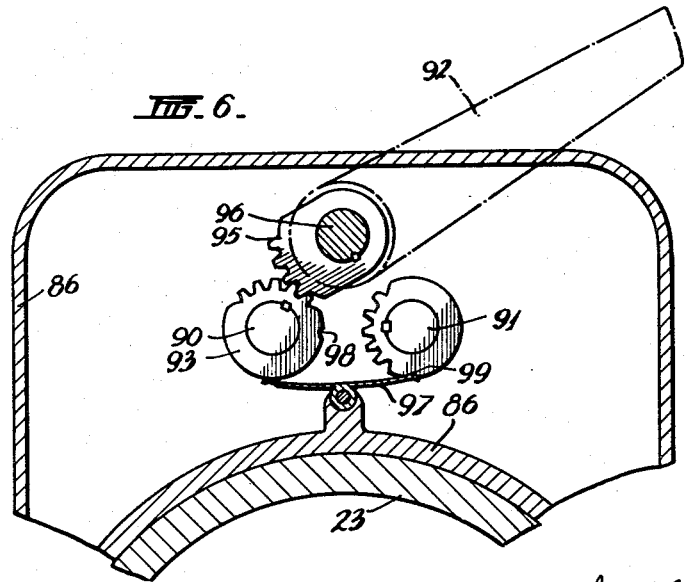

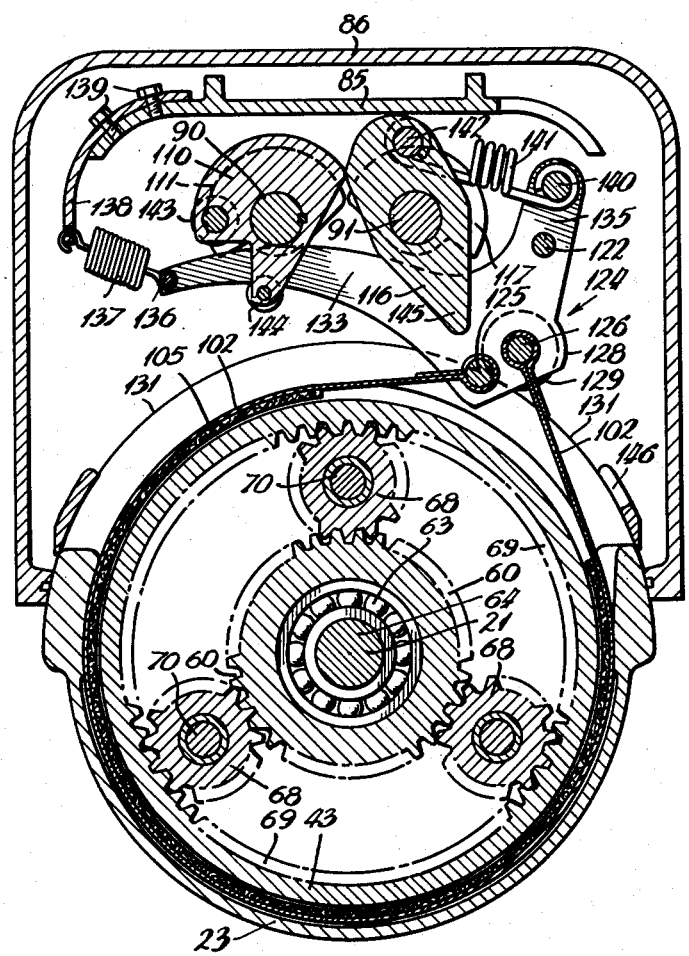

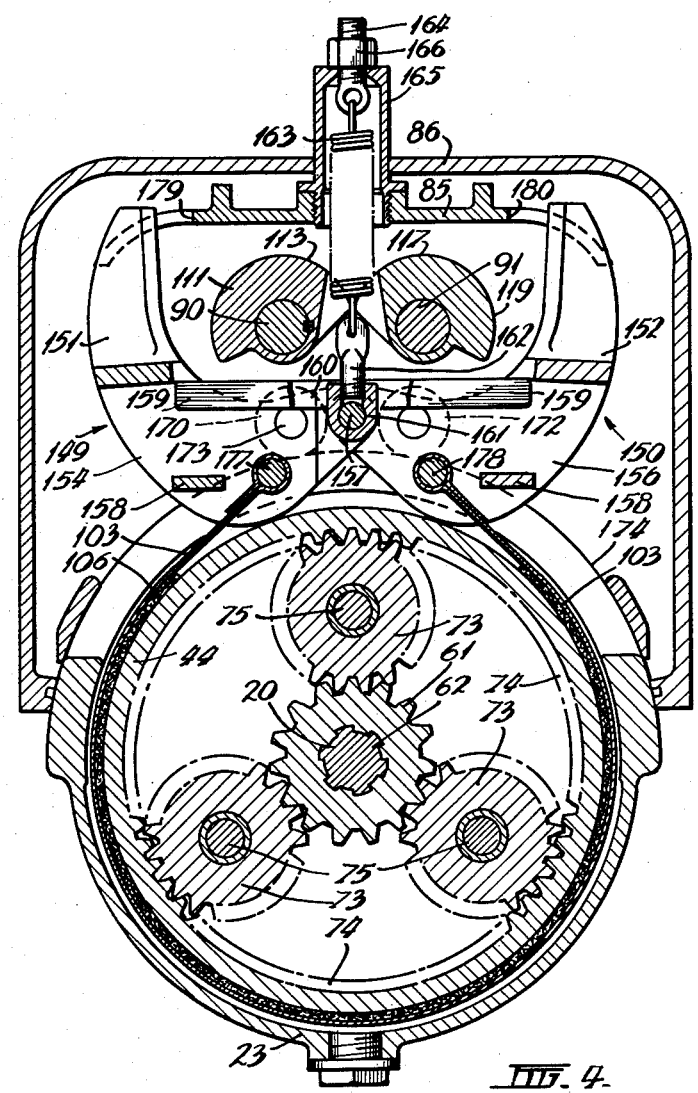

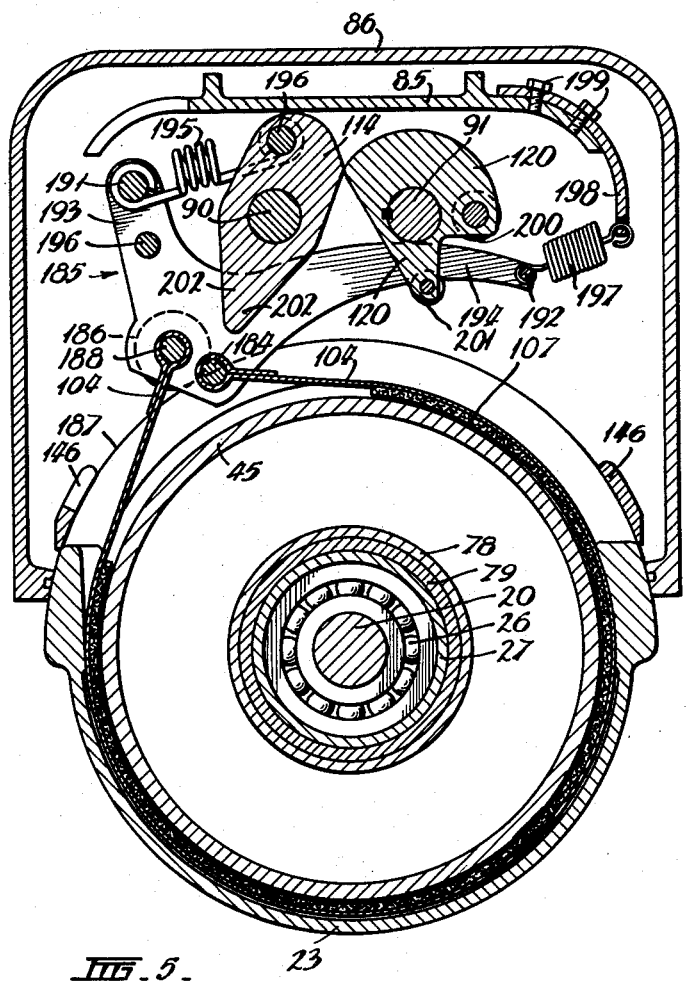

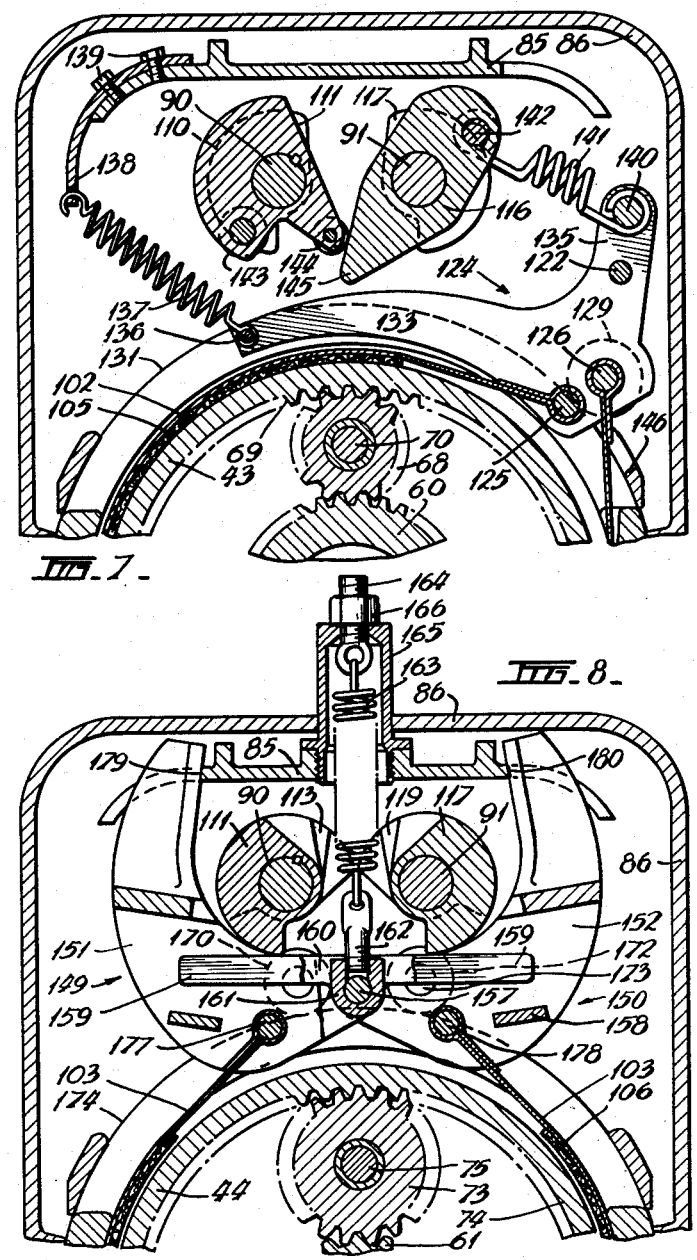

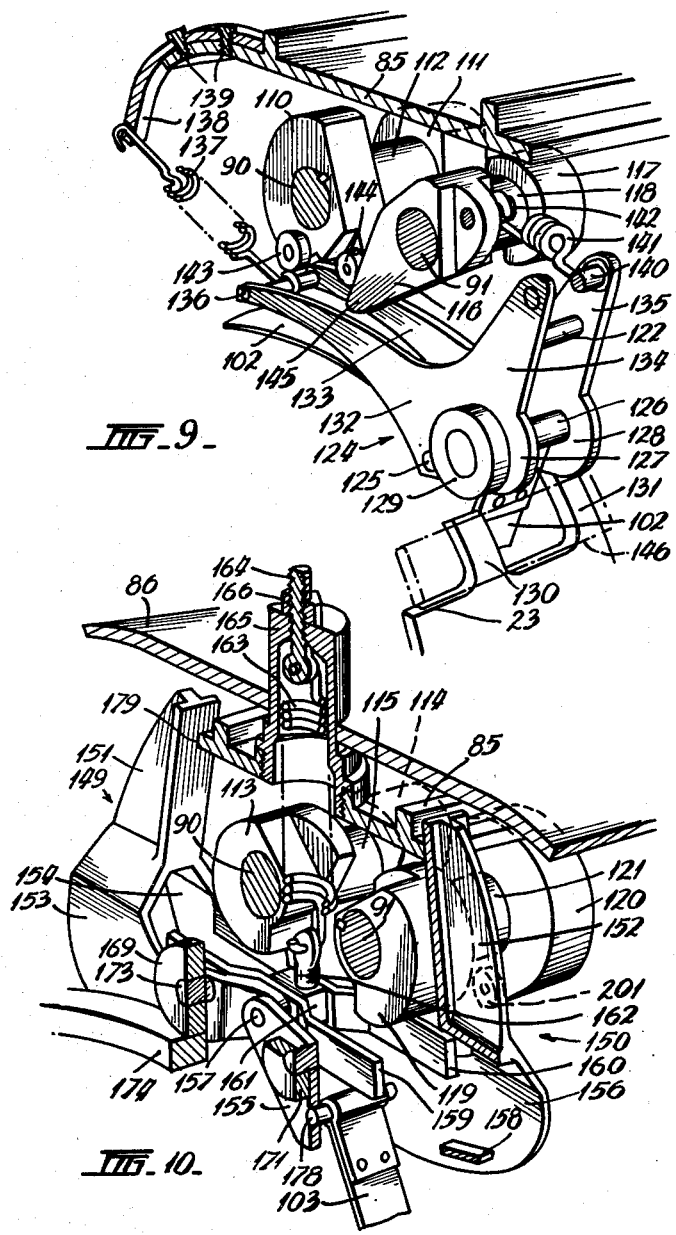

United States Patent Office 3,116,817
Patented Jan. 7, 1964

3,116,817
POWER TRANSMISSION AND BRAKE
MECHANISMS
Kenneth Athol Quick, North Balwyn, Victoria, James William Anderson, Chadstone, Victoria, and William Richard Carter, Donvale, Victoria, all in Australia, assignors to Tranuco Proprietary Limited, East Preston, Victoria, Australia, a corporation of Victoria
Filed May 12, 1961, Ser. No. 109,556
Claims priority, application Australia May 17, 1960
8 Claims. (Cl. 192—4)

This invention relates to improvements in power transmission and brake mechanisms and refers especially to a mechanism whereby the transmission of power to a load is regulated or controlled by the utilisation of one or more brake mechanisms. The invention is particularly, but not exclusively, concerned with an epicyclic gear box having a series of braking drums. The invention is also concerned with the improved brake mechanisms hereinafter described, including the provision of brake mechanisms which are self-energising in one or both directions of output rotation, which permit the smooth transfer of load torque in one or both directions of output rotation, and which prevent over-running of the output mechanism relative to the input mechanism.

It is an object of the present invention to provide improved apparatus of the type described which is efficient in use and which possesses advantages in design and operation over similar types of apparatus previously in use.

According to the invention, power transmission mechanism comprises an input shaft and an output shaft, a rotatable drive brake member, drive brake mechanism associated with the drive brake member, gearing connecting the drive brake member with the input shaft and output shaft so that the output shaft is driven when rotation of the drive brake member is retarded or arrested by the drive brake mechanism, the said drive brake mechanism comprising a braking member adapted to frictionally engage the drive brake member, an operating lever connected to the braking member, the operating lever being caused by the torque reaction of the drive brake member to move along a fixed path when the braking member engages the drive brake member, and means for causing rotation of the operating lever so as to increase the friction between the braking member and the drive brake member as the operating lever moves along the said path.

The power transmission mechanism of this invention may include both forward drive brake mechanism and reverse drive brake mechanism, and may also include hold brake mechanism which serves, inter alia, to hold the output shaft stationary when driving torque is not applied thereto from the input shaft.

A feature of the invention resides in the provision of means for enabling the smooth and automatic transfer of load from the hold brake mechanism to either the forward drive brake mechanism or the reverse drive brake mechanism, while preventing either over-running of the output shaft or rotation of the output shaft in a direction opposite to that in which it is being driven.

Another feature of the invention resides in the provision of means whereby the drive brake mechanisms and the hold brake mechanism are self-energising, and of means whereby the energy required for the disengagement of the hold brake mechanism is derived from the input shaft, so that the force required for operation of the control lever or the like is relatively small.

A further feature of the invention is that the hold brake mechanism is self-applied by spring means so that if the mechanism fails for any reason it will fail in a safe manner, that is, in a manner such as to prevent rotation of the output shaft.

The drive brake member or members preferably comprise brake drums arranged coaxially with the input shaft and output shaft, and the braking member or members preferably comprise brake bands arranged to frictionally engage the external peripheries of the brake drums, but it will be understood that other types of braking systems, and any number of brake drums, may be employed.

Other objects and features of the invention will be apparent from the ensuing description of the form of the invention illustrated in the accompanying drawings, wherein:

FIGURE 1 is a view in sectional side elevation of a power transmission mechanism incorporating a forward drive brake assembly, a hold brake assembly, a reverse drive brake assembly, and control mechanism therefor, FIGURE 2 is a view in sectional end elevation taken on the line 2—2 of FIGURE 1, showing the control lever and associated mechanism, FIGURE 3 is a view in sectional end elevation taken on the line 3—3 of FIGURE 1, showing the forward drive brake assembly in its disengaged position, the hold brake assembly and reverse drive brake assembly being omitted for convenience of illustration, FIGURE 4 is a view in sectional end elevation taken on the line 4—4 of FIGURE 1, showing the hold brake assembly in its engaged position, but without torque being applied, the reverse drive brake assembly being omitted for convenience of illustration, FIGURE 5 is a view in sectional end elevation taken on the line 5—5 of FIGURE 1, showing the reverse drive brake assembly in its disengaged position, FIGURE 6 is a view in sectional end elevation similar to FIGURE 2 showing the control lever moved to the forward drive position, FIGURE 7 is a view in sectional end elevation similar to FIGURE 3 and showing the forward drive brake assembly in its engaged position, FIGURE 8 is a view in sectional end elevation similar to FIGURE 4 and showing the hold brake in its disengaged position, FIGURE 9 is a perspective view, partly broken away for convenience of illustration, of the forward drive brake assembly in its engaged position, and FIGURE 10 is a perspective view, partly broken away for convenience of illustration, of the hold brake assembly in its disengaged position.

Referring to the drawings, the reference numeral 20 indicates an input shaft which is driven by a suitable source of power (not shown), and the reference numeral 21 indicates an output shaft which is connected to a load (not shown), the output shaft being driven from the input shaft by means of epicyclic gearing housed in a gearbox 22.

The gearbox body is formed in two parts 23, 24 secured together by bolts 25. The input shaft 20 is rotatably carried in a ball bearing 26 mounted in an inwardly projecting boss 27 formed integrally with the gearbox body part 23. The bearing 26 is held in position in the boss 27 by an end cap 28 which is secured by bolts 29 to the body part 23, and a sealing washer 30 is inserted in the annular space between the end cap 28 and the shaft 20. The shaft 20 is located axially relative to the bearing 26 by a nut 31 screwed to a threaded portion of the shaft 20, a washer 32 being disposed between the nut 31 and bearing 26.

The output shaft 21 is rotatably carried in ball bearings 34, 35 which are mounted within the gearbox body part 24. The ball bearing 34 is held in position by an end cap 36 which is secured to the body part 24 by bolts 37. A sealing washer 38 surrounds the shaft 21 within an annular recess 39 in the end cap 36. A nut 40 is screwed to a threaded part of the shaft 21 and a washer 41 is located between the nut 40 and the bearing 34.

Rotatably mounted within the gearbox 22 are a forward drive brake member which comprises a drum 43, a hold brake member which comprises a drum 44 and a reverse drive brake member which comprises a drum 45, all of which are coaxial with the input shaft 20 and output shaft 21.

The forward drive brake drum 43 is connected by a radial integral web 46 to an integral cylindrical boss 47 which rotates within the bearing 35 and is located axially by a circlip 48.

A cylindrical bearing 50 fits within the boss 47 and surrounds a cylindrical extension 51 which is formed integrally with a drive plate 52 and is splined to the splined portion 53 of the output shaft 21. Thrust washers 54, 55 surround the shaft 21 at opposite ends of the bearing 50. A cylindrical spacer 56 surrounds the shaft 21 between the bearing 34 and a thrust plate 57 which abuts the end of the cylindrical extension 51 on the drive plate 52.

Sun gears 60, 61 are formed integrally with one another and the sun gear 61 is mounted on and splined to the inner end 62 of the input shaft 20. The sun gear 60 is rotatably mounted on a ball bearing 63 carried on the reduced inner end 64 of the output shaft 21. A spacer 65 surrounds the shaft 20 between the sun gear 61 and the bearing 26.

Equally spaced around the sun gear 60 and in engagement therewith are three planetary gears 68 which also engage an annulus gear 69 formed on the internal periphery of the forward drive brake drum 43. Each planetary gear is journalled on a shaft 70 which is secured at one end in an aperture in the drive plate 52 and at the other end in an aperture formed in an annular extension 71 formed integrally with the hold brake drum 44.

Three planetary gears 73 are equally spaced around the sun gear 61 and are in engagement therewith and also with an annulus gear 74 formed on the internal periphery of the hold brake drum 44. Each planetary gear 73 is journalled to a shaft 75 which is secured at one end in an aperture formed in a plate 76 and at the other end in an aperture formed in the radial web 77 of the reverse drive brake drum 45. The said web 77 of the reverse drive brake drum 45 is formed with a central integral boss 78 which rotates on a bearing 79 surrounding the boss 27 on the gearbox body part 23.

Braking mechanisms are associated with the brake drums 43, 44, 45 as hereinafter described. The epicyclic gearing described above is such that if the forward drive brake drum 43 is held stationary and the other two brake drums 44, 45 are free to rotate, the output shaft 21 rotates in the same direction as the input shaft 20 at a speed depending on the gear ratios. If the reverse drive brake drum 45 is held stationary and the other two brake drums 43, 44 are free to rotate, the output shaft 21 rotates in the opposite direction to the input shaft 20 at a speed depending on the gear ratios. If the hold brake drum 44 is held stationary and the other two brake drums 43, 45 are free to rotate, the output shaft 21 will be held stationary.

The brake mechanisms are mounted on a frame 82 which is secured to the gearbox 22 by bolts (not shown) and comprises end members 83, 84 and an integral upper part 85 extending therebetween. A cover 86 fits over the frame 82 and is secured in position by bolts 87.

A forward drive control shaft 90 and a reverse drive control shaft 91 are arranged parallel to one another and are journalled in the end members 83, 84 of the frame 82. Either of the control shafts 90, 91 is rotatable through a predetermined angular distance by means of the control lever 92. As shown in FIGURES 1, 2 and 6 the control shafts 90 and 91 are provided on their ends with pinions 93, 94 respectively which are engageable by a quadrant 95. The latter is secured to the end of a shaft 96 which is rotatable in a bearing mounted in the cover 86, and the control lever 92 is secured to the outer end of the shaft 96. When the control lever 92 is in the vertical or neutral position as shown in FIGURES 1 and 2 the controls shafts 90, 91 are in the positions shown in FIGURES 1 to 5. When the control lever 92 is moved to the forward drive position shown in FIGURE 6 the quadrant 95 engages the pinion 93 on the control shaft 90 and rotates the latter in an anticlockwise direction when viewed as in any of FIGURES 2 to 8. When the control lever 92 is moved in the opposite direction the quadrant 95 engages the pinion 94 on the control shaft 91 and rotates the latter in a clockwise direction when viewed as in any of FIGURES 2 to 8. When the control lever 92 is returned to the neutral position the control shafts 90, 91 are returned to the positions shown in FIGURES 1 to 5. A leaf spring 97 is provided the ends of which are adapted to engage recesses 98, 99 formed in the peripheries of the pinions 93, 94 in order to locate the control shafts 90, 91 in their correct positions.

Braking members which comprise brake bands 102, 103 and 104 surround the forward drive brake drum 43, hold brake drum 44 and reverse drive brake drum 45, respectively, and are provided with brake linings 105, 106 and 107 respectively. The said brake bands 102, 103 and 104 are caused to engage or disengage the respective brake drums by means of the forward drive brake mechanism (FIGURES 3, 7 and 9), the hold brake mechanism (FIGURES 4, 8 and 10) and the reverse drive brake mechanism (FIGURE 5), respectively, the said brake mechanism being operated by the control lever 92 and also by the degree of torque applied to the brake drums, as hereinafter described.

Mounted on the control shafts 90, 91 are a series of cams and rocking levers. Keyed to the control shaft 90 is a forward drive cam 110 which forms part of the forward drive brake mechanism, and a first hold brake cam 111 which forms part of the hold brake mechanism, the cams 110 and 111 being connected together by a sleeve 112. Also mounted on the shaft 90 and free to rotate thereon are a third hold brake cam 113 forming part of the hold brake mechanism and a reverse drive rocking lever 114 forming part of the reverse drive brake mechanism, the cam 113 and rocking lever 114 being secured together by a sleeve 115. A forward drive rocking lever 116 forming part of the forward drive brake mechanism and a second hold brake cam 117 forming part of the hold brake mechanism are mounted on the control shaft 91 and are free to rotate thereon and are secured together by a sleeve 118. A fourth hold brake cam 119 forming part of the hold brake mechanism and a reverse drive cam 120 forming part of the reverse drive brake mechanism are keyed to the control shaft 91 and are secured together by a sleeve 121.

Referring to the forward drive brake illustrated in FIGURES 3, 7 and 9, the ends of the brake band 102 are pivotally attached to the forward drive brake operating lever 124 by means of pins 125, 126 which extend between the two spaced identical parallel sections 127, 128 of the operating lever 124. The operating lever 124 is "floating," that is, it is not pivoted to any fixed point. The operating lever 124 is permitted to move in an arcuate direction substantially parallel to the periphery of the brake drum 43 by means of a pair of rollers 129 mounted on the ends of the pin 126, the said rollers being caused to run on arcuate tracks 130, 131 formed on the body 23 of the machine. At the same time, the operating lever 124 is capable of pivoting about the axis of the pin 126.

The lever 124 is provided with a pair of parallel arms 132, 133 which extend laterally beneath the cam 110, and with a second pair of parallel arms 134, 135 which extend in a direction approximately radially outwards from the periphery of the brake drum 43 and are connected by a strengthening pin 122. The ends of the arms 132, 133 are joined by a pin 136 which is connected by a tension spring 137 to a bracket 138 which is secured to the frame 85 by bolts 139. The ends of the arms 134, 135 are joined by a pin 140 which is connected by an extensible link member (which comprises a tension spring 141) to an anchor point, comprising a pin 142 attached to the upper end of the rocking lever 116. Rollers 143 are provided on the cam 110 to engage the upper faces of the arms 132, 133 of the operating lever 124 and rollers 144 are also provided on the cam 110 to engage the lower end 145 of the rocking lever 116. A stop 146 is provided on the body 23 which is engaged by the operating lever 124 when the latter is moved along the tracks 130, 131 beyond the position shown in FIGURES 7 and 9, as hereinafter described.

Referring to FIGURES 4, 8 and 10 in which the hold brake mechanism is illustrated, the said mechanism includes a pair of hold brake operating levers 149, 150 which are of approximate L-shape when viewed in side elevation as in FIGURES 4 and 8. The said operating levers 149, 150 comprise upwardly extending flanged portions 151, 152 and the said levers are bifurcated below the upper portions 151, 152 so as to form two pairs of parallel spaced arms 153, 154 and 155, 156 respectively, the arms 153 and 154 being formed integrally with the upper portion 151 of the operating lever 149 and the arms 155 and 156 being formed integrally with the upper portion 152 of the operating lever 150. The arms 153 and 154 and the arms 155 and 156 are connected by strengthening pieces 158. The inner ends of the arms 153, 154, 155 and 156 are pivoted to a central pin 157.

A pair of parallel cam-engaging levers or beams 159, 160 are disposed between the spaced arms 153 and 154 of the operating lever 149 and between the spaced arms 155 and 156 of the operating lever 150. The pin 157 passes through the centers of the levers 159, 160 and through the spacing block 161 disposed between the center portions of said levers 159, 160. A threaded pin 162 is screwed into the spacing block 161 and the lower end of a tension spring 163 is attached to the threaded pin 162. The upper end of the tension spring 163 is attached to the lower end of a threaded pin 164 which passes upwardly through an aperture in a sleeve 165 which projects upwardly from the frame 85 and is attached at its lower end by screw threading to a threaded aperture in the said frame. A nut 166 is screwed to the projecting threaded end of the pin 164 for the purpose of adjusting the tension on the spring 163. If desired a Bowden cable or other remote control means (not shown) may be provided for raising or lowering the pin 164 in order to regulate the tension applied to the tension spring 163 and thence to the pin 157 and the operating levers 149, 150.

Rollers 169, 170, 171 and 172 are rotatably mounted on the arms 153, 154, 155 and 156 respectively by means of pins 173 projecting from and secured to said arms and said rollers are caused to run on arcuate tracks 174 formed on the periphery of the upper part of the gearbox body 23. The said arcuate tracks 174 are substantially parallel to the periphery of the hold brake drum 44.

The ends of the hold brake band 103 are secured to pins 177 and 178 which extend between and are attached to the arms 153, 154 of the operating lever 149 and the arms 155, 156 of the operating lever 150, respectively.

The inward movement of the upper portions 151, 152 of the operating levers 149, 150 is limited by the said portions engaging stops or abutments 179, 180 which are formed by opposite faces of the frame 85.

The hold brake is shown in its engaged position in FIGURE 4, but with no torque applied, the cams 111, 117, 113 and 119 being out of contact with the cam-engaging levers 159, 160 and the hold brake band 103 being tensioned by means of the spring 163. In FIGURES 8 and 10 the hold brake is shown in its disengaged position, the operating levers 149, 150 having been moved to the positions shown in these figures against the action of the spring 163 due to the cams 111, 117 engaging the lever 159 or to the cams 113, 119 engaging the lever 160. The operation of the hold brake will be more fully described below.

The reverse drive brake mechanism is illustrated in FIGURE 5. This mechanism is identical to the forward drive brake mechanism illustrated in FIGURES 3, 7 and 9 except that it is of the opposite hand. The said reverse drive brake mechanism comprises a reverse drive brake operating lever 185 which is a floating lever as is the forward drive operating lever 124. The operating lever 185 is provided with rollers 186 which run on arcuate tracks 187 which are formed on the upper periphery of the gearbox body 23 and extend substantially parallel to the periphery of the reverse brake drum 45. The rollers 186 are mounted on a pin 188 secured to the operating lever 185 and one end of the reverse brake band 104 is attached to the pin 188. The other end of the brake band 104 is attached to a pin 189 secured to the operating lever 185.

The operating lever 185 is formed of two identical parallel sections which are connected by the pins 188, 189 and by a strengthening piece 190 and by pins 191 and 192. The pin 191 extends between the ends of parallel arms 193 of the operating lever 185, which arms 193 extend approximately radially outwards from the periphery of the brake drum 45. The pin 192 extends between the ends of parallel lateral arms 194 of the operating lever 185, which arms 194 extend beneath the cam 120 and the rocking lever 114.

A tension spring 195 extends between the pin 191 and a pin 196 attached to the upper end of the rocking lever 114. A tension spring 197 extends between the pin 192 and a bracket 198 secured by bolts 199 to the frame 85.

Rollers 200 are provided on the cam 120 and are adapted to engage the upper faces of the lateral arms 194 of the operating lever 185, and rollers 201 are also provided on the cam 120 which are adapted to engage the lower portion 202 of the rocking lever 114 when the reverse drive brake is engaged, as hereinafter described.

A stop 146 is provided on the body 23 for engagement by the operating lever 185 under certain conditions of operation, as described below.

The operation of the apparatus will now be described. As previously stated the input shaft 20 is driven by a suitable source of power and its speed of rotation and the torque applied to it may be varied within the capacity of the power source in the usual manner. The output shaft 21 is connected to a load such as a winch drum, the driving wheels of a vehicle, or other output mechanism. When the control lever 92 is in the vertical or neutral position as indicated in FIGURES 1 to 5, the control shafts 90, 91 are retained in the positions indicated in these figures by means of the ends of the leaf spring 97 engaging the recesses 98, 99 in the pinions 93, 94 attached to the shafts 90, 91. In this position of the control shafts 90, 91 the cam 110 is in the position indicated in FIGURE 3 and consequently the forward drive operating lever 124 is held in its uppermost position by the spring 137 and the brake band 102 is disengaged from the forward drive brake drum 43 and the latter is free to rotate. The cams 111 and 117 of the hold brake mechanism are in the positions indicated in FIGURE 4, the cams 113 and 119 are in the positions indicated in FIGURE 8, and the levers 149 and 150 are moved to their outer positions as indicated in FIGURE 4 by the raising of the pin 157 and levers 159, 160 under the influence of the spring 163, and this has the effect of tightening the brake band 103 on the hold brake drum 44 so as to prevent its rotation. The reverse drive brake mechanism is in the disengaged position as illustrated in FIGURE 5, so that the reverse drive brake drum 45 is free to rotate.

When the apparatus is arranged and operating as indicated in FIGURES 1 to 5, the control lever 92 being in the neutral position, the output shaft 21, being connected through the drive plate 52 and shafts 70 to the hold brake drum 44, is held stationary by the hold brake mechanism. The direction of rotation of the forward brake drum 43 is clockwise as viewed in FIGURES 3 and 7; and the direction of rotation of the reverse brake drum 45 is anti-clockwise as viewed in FIGURE 5.

When the control lever 92 is moved to the forward drive position as indicated in FIGURE 6, the shaft 90 is rotated anti-clockwise by the said control lever 92, and the cam 110 is moved to the position indicated in FIGURES 7 and 9 and the cam 111 (which is connected to the cam 110 and to the shaft 90) is moved to the position shown in FIGURES 7 and 8. Referring to FIGURES 3 and 7, it will be noted that the said rotation of the cam 110 causes the rollers 143 to engage the arms 132, 133 of the operating lever 124 and rotates the lever 124 anti-clockwise about the axis of the rollers 129. This movement of the lever 124 tightens the brake band 102 on the brake drum 43, and the friction between the brake band 102 and the brake drum 43 causes the lever 124 to be moved bodily in the direction of rotation of the brake drum, until it reaches a position such as that shown in FIGURE 7. This movement of the lever 124 is effected in an arcuate direction due to the rollers 129 running on the tracks 130, 131. At the same time, the spring 137 and the link member or spring 141 are tensioned by the movement of the lever 124, and the spring 141 causes the rocking lever 116 to rotate clockwise to a position such as that shown in FIGURE 7. At this point, the rollers 144 on the cam 110 engage the side face of the lower part 145 of the rocking lever 116 and further rotation of the rocking lever 116 is prevented.

If the control lever 92 is moved slowly to the forward drive position, the movement of the operating lever 124 along the tracks 130, 131 may cause the rocking lever 116 to be rotated clockwise to a position beyond that shown in FIGURE 7, before the rocking lever 116 is engaged by the rollers 144 on the cam 110. Further movement of the control lever 92 and cam 110 then moves the rocking lever 116 anti-clockwise until the control lever 92 strikes a stop (not shown) which prevents its further movement. This ensures smooth engagement of the brake, under the control of the control lever 92.

The tension applied to the spring 141 by the above described movement of the lever 124 along the tracks 130, 131 causes the lever 124 to rotate further in an anti-clockwise direction about the axis of the rollers 129, so that the pins 125 and 126 to which the ends of the brake band 102 are secured are moved so as to further tighten the brake band 102 on the drum 43. Thus the forward drive brake is self-energising, and the extent to which it is self-energising may be determined by the selection of the relative positions of the pins 125, 126 and 140.

When the brake is arranged so as to be self-energising to such a degree as to tend to be self-locking, the force on the control lever 92 necessary to secure engagement of the brake becomes very small.

The forward drive brake automatically operates to reduce the braking force and allow slipping of the brake drum 43 when the torque reaction from the brake drum 43 exceeds a predetermined value. This is achieved by the lever 124 being moved along the arcuate tracks 130, 131 in a clockwise direction until it contacts the stop 146. Further movement of the lever 124 (the control lever 92 being still in the forward drive position) then causes said lever 124 to rotate in a clockwise direction about the axis of the rollers 129, thus loosening the brake band 102 and allowing the brake to slip while maintaining the predetermined torque reaction.

The forward drive brake may be released manually by returning the control lever 92 to the neutral position. This causes the shaft 90 and cam 110 to return to their original positions, and the rocking lever 116 is thus permitted to rotate further in the clockwise direction. The lever 124 then contacts the stop 146 and rotates in a clockwise direction to an extent sufficient to release the tension in the brake band 102. As the brake band 102 is disengaged from the brake drum 43, the lever 124 is returned along the arcuate tracks in an anti-clockwise direction under the influence of spring 137 until it reaches its original position as shown in FIGURE 3.

Referring to the operation of the hold brake mechanism shown in FIGURES 4, 8 and 10, the movement of the control lever 92 to the forward drive position as above described causes the shaft 90 to be rotated anticlockwise and this causes the cam 111 to be rotated from the position shown in FIGURE 4 to the position shown in FIGURE 8. At the same time the clockwise rotation of the rocking lever 116 from the position shown in FIGURE 3 to the position shown in FIGURE 7 during the engagement of the forward drive brake causes cam 117 which is connected to the rocking lever 116 to be similarly rotated in a clockwise direction from the position shown in FIGURE 3 to the position shown in FIGURES 7 and 8. The movement of the cams 111 and 117 to the positions shown in FIGURE 8 causes such cams to engage the lever 159 and to move the said lever downwardly against the action of the spring 163. This downward movement of the lever 159 moves the pin 157 downwardly and consequently the lower ends of the operating levers 149, 150 which are pivoted to the pin 157 are also moved downwardly. This movement of the operating levers 149, 150 causes the lever 149 to rotate clockwise about the axis of the rollers 169, 170 and causes the lever 150 to rotate anti-clockwise about the axis of the rollers 171, 172. The downward movement of the pin 157 and the abovedescribed rotation of the levers 149, 150 caused by the downward movement of the pin 157 has the effect of moving apart the pins 177, 178 to which the ends of the hold brake band 103 are attached and consequently the said brake band is loosened and the hold brake drum 44 is free to rotate.

If the operating forces causing the rotation of either of the cams 111, 117 to the positions shown in FIGURE 8 are removed for any reason, the lever 159 is permitted to rise under the action of the spring 163 and consequently the pin 157 rises and tension is reapplied to the brake band 103. Friction is thus created between the lining 186 of the brake band 103 and the brake drum 44 and this causes levers 149 and 150 to be moved bodily in the direction of rotation of the drum 44 due to the torque applied to the brake band 103, and the said movement of the levers 149, 150 is in an arcuate direction due to rotation of the rollers 169 to 172 on the tracks 174. The said arcuate movement of the levers 149, 150 in either direction is arrested by the upper end 151 of the lever 149 engaging the stop 179 or the upper end 152 of the lever 150 engaging the stop 180, and the application of further torque to the brake band 103 in the same direction will then cause the said brake band to be further tightened. The hold brake mechanism is thus self-energising for both directions of rotation of the drum 44. Any desired degree of self-energising effect of the hold brake mechanism may be obtained by suitable selection of the relative positions of the pins 157, 177 and 178.

If the cam 111 is moved to the "on" position of FIGURE 8 while the cam 117 remains in the "off" position of FIGURE 4, or if the cam 113 is moved to the "on" position of FIGURE 10 while the cam 119 remains in the "off" position, the lever 159 or the lever 160 as the case may be pivots about the pin 157 and the hold brake remains engaged under the influence of the spring 163. The hold brake is only released if both the cam 111 and cam 117, or both the cam 113 and cam 119, are moved to their "on" positions. If the hold brake is "off," and either of the cams 111, 117 (or either of the cams 113, 119) is moved to the "off" position, the hold brake will automatically be re-engaged.

It will be understood that as the forward drive brake is engaged by movement of the control lever 92 from the position shown in FIGURE 2 to the position shown in FIGURE 6, the said rotation of the shaft 90 by the control lever 92 together with the rotation of cam 117 caused by engagement of the forward drive brake, cause the hold brake to be released as the forward drive brake is engaged, and the return of the control lever 92 to the neutral position causes the hold brake to be re-engaged as the forward drive brake is disengaged. Consequently the output shaft 21 is at all times prevented from reverse rotation under the influence of the load when forward drive torque is not being applied to it. Thus in the case of a winch, for example, the winch drum is prevented from running backwards under the load when it is not being driven, and in the case of a vehicle being started on an incline, the vehicle will be prevented from running backwards during the starting procedure.

If the output shaft 21 tends to overrun the input shaft 20 while the control lever 92 is in the forward drive position, the reduction of torque applied to the forward drive drum 43 will cause the forward drive operating lever 124 to move in an anti-clockwise direction along the arcuate tracks 130, 131 and consequently the rocking lever 116 will rotate anticlockwise and the cam 117, being connected to the rocking lever 116, will be similarly rotated. This will cause the hold brake to be applied under the influence of the spring 163. Consequently the output shaft 21 is automatically slowed down to the extent necessary to prevent overrunning.

Referring to the reverse drive brake mechanism shown in FIGURE 5, it has been previously mentioned that this mechanism is identical with the forward drive brake mechanism but is of opposite hand. Consequently the operation of the reverse drive brake mechanism is the same as the operation of the forward drive brake mechanism which has been described above except that the movement of the various parts of the reverse drive brake mechanism takes place in the opposite direction. The reverse drive is brought into operation by moving the control lever 92 to a similar position to that shown in FIGURE 6 but in the opposite direction so that the pinion 94 and shaft 91 are rotated clockwise, the shaft 90 being allowed to remain in its neutral position. This rotation of shaft 91 causes the rollers 200 on the cam 120 to engage the arms 194 of the reverse drive brake operating lever 185 (see FIGURE 5) so as to cause the reverse drive brake to be applied. The reverse drive brake is self-energising in the same way as the forward drive brake. The movement of the operating lever 185 in an anti-clockwise direction along the arcuate tracks 187 as the reverse drive brake is applied causes the spring 195 to rotate the rocking lever 114 in an anti-clockwise direction about the shaft 90 until the rollers 201 on the cam 120 engage the lower end 202 of the rocking lever 114, thus arresting further rotation of the rocking lever 114. The reverse drive brake is automatically disengaged and the hold brake is automatically re-engaged in the event of (a) overrunning of the output shaft 21 relative to the input shaft 20, (b) removal or failure of the operating forces retaining either the cam 113 (which is connected to the rocking lever 114) or the cam 119 (which is connected to the cam 120) in their "on" positions as indicated in FIGURE 10, or (c) the return of the control lever 92 to the neutral position. In these and other respects, therefore, the operation of the reverse drive brake is the same as that of the forward drive brake.

It will be noted that the hold drive brake is self-applied by means of the spring 163 so that if the mechanism fails due to any cause, it will fail in a safe manner, i.e. in a manner such as to prevent rotation of the output shaft. Loss of torque transferred from either the forward drive brake drum 43 or from the reverse drive brake drum 45 causes the hold brake to be applied.

A feature of the invention is that the mechanism permits the smooth transfer of load torque from the hold brake to either of the driving brakes automatically, and accomplishes this in both directions of output rotation.

A common example of an application of this effect is the case in which it is desired to start a motor vehicle on an upgrade. With normal mechanisms it is necessary to hold a brake in engagement until a gear is brought into mesh and to engage the drive clutch at the same time as the brake is released. With the present mechanism, all that is necessary is to engage one of the drive brakes, which automatically applies output torque and automatically releases the hold brake without allowing running back, and achieves this in either selected direction.

A further feature of the invention is that the mechanism prevents overrunning of output relative to the input. Reversal of the reaction torque on the drive brake causes the hold brake to be applied and thus slows down the output to keep in step with the input. This effect permits servo-control of output rotation, thus permitting large output torques to be achieved by means of small input torques.

A still further, and important, feature of the invention is that the energy required to disengage the hold brake is obtained primarily from the input shaft through the forward or reverse drive brake mechanism. The hold brake is thus servo-operated, and this enables operation of the control lever to be effected by a relatively small force.

We claim:

1. Power transmission mechanism comprising an input shaft and an output shaft, a rotatable drive brake drum and a rotatable hold brake drum arranged coaxially with the input shaft and output shaft, gear mechanism operably connecting the drive brake drum and hold brake drum with the input shaft and output shaft so that the output shaft is driven by the input shaft when the rotation of the drive brake drum is retarded or arrested and the output shaft is held stationary when the hold brake drum is held stationary, a drive brake band surrounding the drive brake drum, hold brake mechanism operably associated with the hold brake drum, a floating operating lever to which the ends of the drive brake band are pivotally connected at closely spaced points, a fixed arcuate guide track arranged substantially parallel with the periphery of the drive brake band, means on the floating operating lever to engage the guide track so that the said operating lever may move along the said guide track, a drive cam having a drive position and a neutral position and being arranged so that when it is moved to the drive position it engages the operating lever and rotates said lever in one direction so as to tighten the drive brake band on the drive brake drum, the operating lever being then moved along the guide track from an "off" position to an "on" position by rotation of the drive brake band which frictionally engages and is moved by the drive brake drum, a link member connecting the operating lever to an anchor point, the link member being arranged to rotate the operating lever in the same direction to further tighten the drive brake band on the drive brake drum as the said operating lever is moved along the guide track, and mechanism operably connecting the link member to the hold brake mechanism so that the hold brake mechanism is disengaged when the operating lever is moved to its "on" position and the hold brake mechanism is engaged when the operating lever is returned to its "off" position.

2. Power transmission mechanism comprising an input shaft and an output shaft, a rotatable drive brake drum and a rotatable hold brake drum arranged coaxially with the input shaft and output shaft, gear mechanism operably connecting the drive brake drum and hold brake drum with the input shaft and output shaft so that the output shaft is driven by the input shaft when the rotation of the drive brake drum is retarded or arrested and the output shaft is held stationary when the hold brake drum is held stationary, a drive brake band surrounding the drive brake drum, hold brake mechanism operably associated with the hold brake drum, a floating operating lever to which the ends of the drive brake band are pivotally connected at closely spaced points, fixed arcuate guide tracks arranged substantially parallel with the periphery of the drive brake band, rollers on the floating operating lever which engage the guide tracks so that the said operating lever may move along the said guide tracks, a drive cam having a drive position and a neutral position and being arranged so that when it is moved to the drive position it engages the operating lever and rotates said lever in one direction so as to tighten the drive brake band on the drive brake drum, the operating lever being then moved along the guide tracks from an "off" position to an "on" position by rotation of the drive brake band which frictionally engages and is moved by the drive brake drum, a link member connecting the operating lever to an anchor point, the link member being arranged to rotate the operating lever in the same direction to further tighten the drive brake band on the drive brake drum as the said operating lever is moved along the guide tracks, a stop member which is engaged by the operating lever when the said operating lever has been moved through a predetermined distance along the guide tracks, the stop member being so disposed that further movement of the operating lever along said tracks causes it to rotate in the direction which effects reduction of the braking force, and mechanism operably connecting the link member to the hold brake mechanism so as to disengage the hold brake mechanism from the hold brake drum when the operating lever is moved to its "on" position and to engage the hold brake mechanism with the hold brake drum when the operating lever is returned to its "off" position.

3. Power transmission mechanism comprising an input shaft and an output shaft, a rotatable drive brake drum and a rotatable hold brake drum arranged coaxially with the input shaft and output shaft, gear mechanism operably connecting the drive brake drum and hold brake drum with the input shaft and output shaft so that the output shaft is driven by the input shaft when the rotation of the drive brake drum is retarded or arrested and the output shaft is held stationary when the hold brake drum is held stationary, a drive brake band surrounding the drive brake drum, a hold brake band surrounding the hold brake drum, a floating drive brake operating lever to which the ends of the drive brake band are pivotally connected at closely spaced points, fixed arcuate guide tracks arranged substantially parallel with the periphery of the drive brake band, rollers on the drive brake operating lever which engage the guide tracks so that the said drive brake operating lever may move along the said guide tracks, a drive cam having a drive position and a neutral position and being arranged so that when it is moved to the drive position it engages the drive brake operating lever and rotates said lever in one direction so as to tighten the drive brake band on the drive brake drum, the drive brake operating lever being then moved along the guide tracks from an "off" position to an "on" position by the rotation of the drive brake band which frictionally engages the drive brake drum and is moved by the driving torque thereof, a link member connecting the drive brake operating lever to an anchor point, the link member being arranged to rotate the drive brake operating lever in the same direction to further tighten the drive brake band on the drive brake drum as the said drive brake operating lever is moved along the guide tracks, a hold brake operating lever operably connected to the hold brake band for tightening or loosening same, a hold brake cam for actuating the hold brake operating lever, and means connecting the hold brake cam with the link member whereby the movement of the link member by the drive brake operating lever actuates the hold brake cam and the hold brake actuating lever, the hold brake being disengaged only when the driving torque developed exceeds a predetermined minimum.

4. Power transmission mechanism comprising an input shaft and an output shaft, a rotatable drive brake drum and a rotatable hold brake drum arranged coaxially with the input shaft and output shaft, gear mechanism operably connecting the drive brake drum and hold brake drum with the input shaft and output shaft so that the output shaft is driven by the input shaft when the rotation of the drive brake drum is retarded or arrested and the output shaft is held stationary when the hold brake drum is held stationary, a drive brake band surrounding the drive brake drum, a hold brake band surrounding the hold brake drum, a floating drive brake operating lever to which the ends of the drive brake band are pivotally connected at closely spaced points, fixed arcuate guide tracks arranged substantially parallel with the periphery of the drive brake band, rollers on the drive brake operating lever which engage the guide tracks so that the said drive brake operating lever may move along the said guide tracks, a control lever having a drive position and a neutral position, a drive cam operably connected to the control lever and being arranged so that when the control lever is moved to the drive position the drive cam engages the drive brake operating lever and rotates said lever in one direction so as to tighten the drive brake band on the drive brake drum, the drive brake operating lever being then moved along the guide tracks from an "off" position to an "on" position by the rotation of the drive brake band which frictionally engages the drive brake drum and is moved by the driving torque thereof, a rocking lever capable of limited rotation, an extensible link member extending between the drive brake operating lever and an anchor point on the rocking lever, the link member being so disposed that as the drive brake operating lever is moved to its "on" position along the guide tracks the drive brake operating lever is caused by the link member to rotate further in the same direction so as to further tighten the drive brake band, thus rendering the drive brake self-energising, a stop member which is engaged by the drive brake operating lever when the said lever has been moved through a predetermined distance along the guide tracks, the stop member being so disposed that further movement of the drive brake operating lever along the guide tracks caused the said lever to be rotated in the direction which effects reduction of braking force, a hold brake operating lever operably connected to the hold brake band for tightening or loosening same, a first hold brake cam operably connected to the drive cam, a second hold brake cam operably connected to the rocking lever, the said hold brake cams being arranged to actuate the hold brake operating lever whereby when the drive brake is engaged the hold brake is disengaged and vice-versa, the hold brake being disengaged only when sufficient driving torque is developed to move the drive brake operating lever to its "on" position.

5. Power transmission mechanism according to claim 4 and having a pair of hold brake operating levers pivotally connected to the ends of the hold brake band, a cam-engaging lever pivotally connected to the hold brake operating levers, spring means operably connected to the hold brake operating levers and tending to move said levers to tighten the hold brake band on the hold brake drum, the first and second hold cams being arranged to actuate the cam-engaging lever when the control lever is moved to the drive position and the drive brake is engaged, thereby releasing the hold brake, and the hold brake being re-engaged under the influence of the spring when the first hold cam is moved to its "off" position by return of the control lever to the neutral position or when the second hold cam is moved to its "off" position by rotation of the rocking lever.

6. Power transmission mechanism according to claim 5 wherein the hold brake operating levers are capable of movement in either direction along arcuate tracks disposed substantially parallel to the periphery of the hold brake drum, and having stops which are engaged by the hold brake operating levers, the engagement of either hold brake operating lever with its stop when either first or second hold cam is in its "off" position causing the hold brake band to be further tightened, whereby the hold brake is self-energising in both directions of rotation of the hold brake drum.

7. Power transmission mechanism comprising an input shaft and an output shaft, a forward drive brake drum, a hold brake drum and a reverse drive brake drum, the said hold brake drums being arranged coaxially with the input and output shafts, gearing operably connecting the input and output shafts to the said brake drums so that the output shaft is driven forwardly when the forward drive brake drum is braked, is held stationary when the hold brake drum is held stationary, and is driven in the reverse direction when the reverse drive drum is braked, a forward drive brake band surrounding the forward drive brake drum, a hold brake band surrounding the hold brake drum, a reverse drive brake band surrounding the reverse drive brake drum, a forward drive operating lever to which the ends of the forward drive operating brake band are pivotally attached, a pair of hold brake levers pivoted together and to which the ends of the hold brake band are pivotally attached, a reverse drive operating lever to which the ends of the reverse drive brake band are pivotally attached, arcuate tracks disposed substantially parallel to the peripheries of the brake drums, rollers on the operating levers for guiding same along the arcuate tracks, a control lever having a forward drive position, a neutral position and a reverse drive position, a forward drive cam and a reverse drive cam actuated by the control lever, to the forward drive cam, a forward drive rocking lever, a first link member operably connecting the forward drive operating lever to the forward drive rocking lever, a reverse drive rocking lever, a second link member operably connecting the reverse drive operating lever to the reverse drive rocking lever, the forward drive operating lever being rotated by the forward drive cam when the control lever is moved to the forward drive position, the forward drive operating lever being then moved along the arcuate tracks by the rotation of the forward drive brake band so as to further tighten the forward drive brake band, a first stop which is engaged by the forward drive operating lever when the forward drive torque reaches a predetermined limiting value, the first stop being so disposed that the application of further torque causes the forward drive operating lever to rotate in a direction so as to loosen the forward drive brake band, the reverse drive operating lever being rotated by the reverse drive cam when the control lever is moved to the reverse drive position, the reverse drive operating lever being then moved along the arcuate tracks by the rotation of the reverse drive brake band so as to further tighten the reverse drive brake band, a second stop which is engaged by the reverse drive operating lever when the reverse drive torque reaches a predetermined limiting value, the second stop being so disposed that the application of further torque causes the reverse drive operating lever to rotate in a direction so as to loosen the reverse drive brake band, a first hold cam operably connected to the forward drive cam, a second hold cam operably connected to the forward drive rocking lever, a third hold cam operably connected to the reverse drive rocking lever, a fourth hold cam operably connected to the reverse drive cam, a cam-engaging lever pivoted to the hold brake operating levers and engageable by the hold cams, spring means connected to the hold brake operating levers and tending to tighten the hold brake band on the hold brake drum, the hold brake being disengaged against the action of said spring means only when the cam-engaging lever is actuated by both the first hold cam and second hold cam or by both the third hold cam and fourth hold cam due to the development of sufficient forward or reverse driving torque, and the hold brake being re-engaged under the influence of said spring means when the force actuating either of the operative hold cams is removed.

8. Power transmission mechanism comprising an input shaft and an output shaft, a rotatable drive brake drum and a rotatable hold brake drum arranged coaxially with the input shaft and output shaft, gear mechanism operably connecting the drive brake drum and hold brake drum with the input shaft and output shaft so that the output shaft is driven by the input shaft when the rotation of the drive brake drum is retarded or arrested and the output shaft is held stationary when the hold brake drum is held stationary, a drive brake band surrounding the drive brake drum, a hold brake band surrounding the hold brake drum, a floating drive brake operating lever having a first arm and a second arm, the ends of the drive brake band being pivotally connected to the drive brake operating lever at closely spaced points located at the junction of the first and second arms, a tension spring extending between a point on the first arm and an anchor point, fixed arcuate guide tracks arranged substantially parallel with the perpihery of the drive brake band, rollers on the drive brake operating lever which engage the guide tracks so that the said drive brake operating lever may move along the said guide tracks, a control lever having a drive position and a neutral position, a drive cam operably connected to the control lever and disposed to engage the first arm of the drive brake operating lever to move same towards the drive brake drum and thereby tighten the drive brake band thereon, the drive brake operating lever being then moved along the arcuate tracks by the drive brake band, a rocking lever rotatably mounted on an axis parallel with that of the drive cam, an extensible link extending between an anchor point on the rocking lever and a point on the second arm, stop means for limiting the rotation of the rocking lever, a first hold cam operably connected to the drive cam, a second hold cam operably connected to the rocking lever, hold brake operating levers pivotally connected to the ends of the hold brake band, second arcuate tracks disposed substantially parallel to the periphery of the hold brake drum, rollers on the hold brake operating levers which engage the second arcuate tracks, a hold brake beam pivotally connected to the hold brake operating levers, the first and second hold cams being disposed to engage the hold brake beam, a spring extending between the hold brake operating levers and an anchor point, the spring tending to tighten the hold brake band, the first and second hold cams being arranged so as to move the hold brake beam to disengage the hold brake only when the control lever is in the drive position and the torque reaction of the drive brake band is sufficient to effect rotation of the rocking lever, a stop member which is engaged by the drive brake operating lever when the said lever has been moved through a predetermined distance along the guide tracks, the stop member being so disposed that further movement of the drive brake operating lever along the guide tracks causes the said lever to be rotated in the direction which effects reduction of braking force, and hold brake stops which are engaged by the hold brake operating levers.

References Cited in the file of this patent

UNITED STATES PATENTS

| 1,597,179 | Conkling | Aug. 24, 1926 |
| 2,094,278 | Morin et al. | Sept. 28, 1937 |
| 2,299,765 | Rauen | Oct. 27, 1942 |
| 2,488,756 | Baker | Nov. 22, 1949 |

FOREIGN PATENTS

| 1,029,390 | France | Mar. 4, 1953 |